US012811440B2

(12) United States Patent
Bellm et al.

(10) Patent No.: US 12,811,440 B2
(45) Date of Patent: Nov. 24, 2026

(54) SYSTEM FOR WIRELESSLY TRANSFERRING ENERGY

(71) Applicant: E.G.O. Elektro-Gerätebau GmbH, Oberderdingen (DE)

(72) Inventors: Mathias Bellm, Ubstadt-Weiher (DE); Christian Egenter, Bretten (DE); Max-Felix Müller, Oberderdingen (DE); Ulrich Wächter, Bruchsal (DE)

(73) Assignee: E.G.O. Elektro-Gerätebau GmbH, Oberderdingen (DE)

( * ) Notice: Subject to any disclaimer, the term of this patent is extended or adjusted under 35 U.S.C. 154(b) by 0 days.

(21) Appl. No.: 18/724,001

(22) PCT Filed: Jan. 26, 2023

(86) PCT No.: PCT/EP2023/051920

§ 371 (c)(1),
(2) Date: Jun. 25, 2024

(87) PCT Pub. No.: WO2023/148078

PCT Pub. Date: Aug. 10, 2023

(65) Prior Publication Data

US 2025/0079909 A1 Mar. 6, 2025

(30) Foreign Application Priority Data

Feb. 2, 2022 (DE) ..................... 10 2022 201 120.1

(51) Int. Cl.
*H02J 50/10* (2016.01)
*H02J 50/60* (2016.01)
(Continued)

(52) U.S. Cl.
CPC .............. *H02J 50/60* (2016.02); *H02J 50/10* (2016.02); *H02J 50/80* (2016.02); *H02J 50/90* (2016.02)

(58) Field of Classification Search
CPC .. H02J 50/60; H02J 50/10; H02J 50/80; H02J 50/90; H04B 5/73; H04B 5/77; H04B 5/79
See application file for complete search history.

(56) References Cited

U.S. PATENT DOCUMENTS 9,148,201 B2 * 9/2015 Kallal ..................... H02J 50/80
9,738,170 B2 * 8/2017 Okamoto .............. B60L 53/305
(Continued)

FOREIGN PATENT DOCUMENTS

DE 102009029250 A1 3/2011
WO 2021/142108 A1 7/2021

OTHER PUBLICATIONS

DE Office Action Mailed on Nov. 7, 2022 for DE Application No. 102022201120, 6 page(s).
(Continued)

*Primary Examiner* — Elim Ortiz
(74) *Attorney, Agent, or Firm* — ALSTON & BIRD LLP

(57) ABSTRACT

The invention relates to a system (100), comprising: —a device (1) for wirelessly transferring energy in the direction of an electrical load (2) by means of inductive coupling, —an electrical load (2), —a placement surface (3), on which the electrical load (2) is to be placed as intended for the operation of the system (100), —a useful surface (4) adjacent to the placement surface (3), —a displacement sensor (5) for determining whether or not the electrical load (2) is displaced beyond a critical amount in the direction of the useful surface (4), and—a control unit (6) coupled to the displacement sensor (5) and designed to limit or to interrupt the transfer of energy in the direction of the electrical load (2) if the electrical load (2) is displaced beyond the critical amount in the direction of the useful surface (4).

7 Claims, 1 Drawing Sheet

Figure 1:
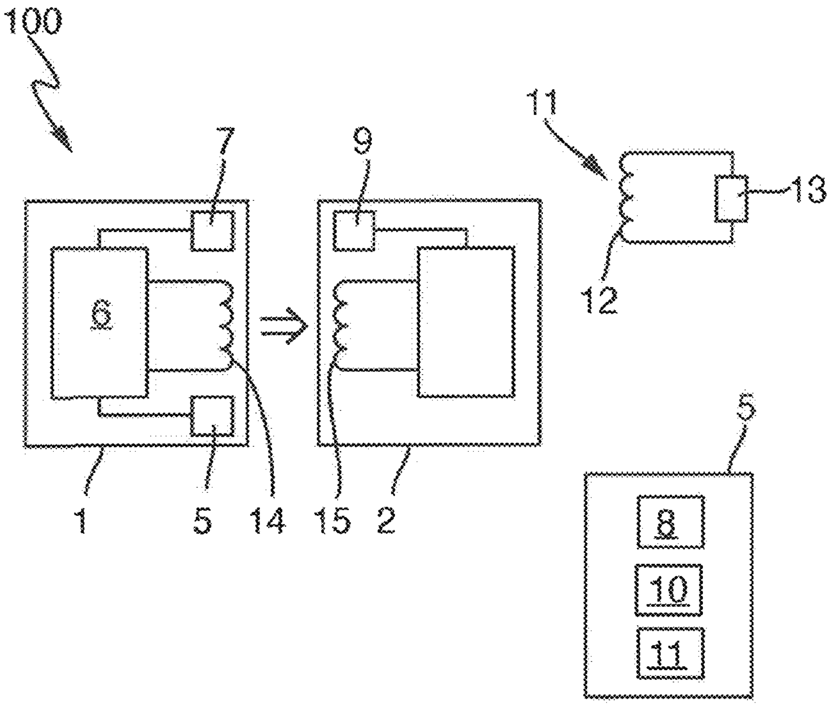

(51) Int. Cl.
*H02J 50/80* (2016.01)
*H02J 50/90* (2016.01)

(56) References Cited

U.S. PATENT DOCUMENTS 9,796,284 B2* 10/2017 Okamoto ................ H02J 50/10
10,603,501 B2* 3/2020 Aghassian ......... A61N 1/36125
11,005,285 B2* 5/2021 Partovi ................. H01F 27/288
11,121,574 B2* 9/2021 Ha .................... H02J 7/007188
11,342,796 B2* 5/2022 Tian ........................ H02J 50/60
2009/0224989 A1* 9/2009 Youn ....................... H01P 1/203 343/722
2012/0235506 A1 9/2012 Kallal et al.
2014/0339923 A1* 11/2014 Simopoulos ........ H02J 7/00034 307/149
2015/0365136 A1* 12/2015 Miller ..................... H02J 50/80 307/104
2016/0001668 A1* 1/2016 Ichikawa .............. B60L 53/122 307/104
2016/0118808 A1* 4/2016 Van Wageningen .. H02J 50/402 307/104
2016/0146886 A1* 5/2016 Finkenzeller .......... H04B 17/16 324/603
2016/0355095 A1* 12/2016 Okamoto ................ B60L 50/51
2017/0288468 A1* 10/2017 Pearson .................. H02J 50/20
2017/0361113 A1 12/2017 Aghassian et al.
2018/0190112 A1 7/2018 Boys
2020/0083754 A1* 3/2020 Tian ........................ H02J 50/60
2020/0099256 A1* 3/2020 Kanakasabai ........... H02J 50/40
2020/0287421 A1* 9/2020 Egenter ............... A47J 43/0465
2020/0345172 A1* 11/2020 Toncelli .............. A47J 36/2483
2020/0412170 A1* 12/2020 Spinella .................. H02J 50/12
2021/0320532 A1 10/2021 Partovi

OTHER PUBLICATIONS

Outgoing—ISA/210—International Search Report and Written Opinion Mailed on May 4, 2023 for WO Application No. PCT/EP23/051920, 13 page(s).

* cited by examiner

SYSTEM FOR WIRELESSLY TRANSFERRING ENERGY

CROSS REFERENCE TO RELATED APPLICATIONS

This application is a national stage application, filed under 35 U.S.C. § 371, of International Application No. PCT/EP2023/051920, filed Jan. 26, 2023, which claims priority to German Application No. 10 2022 201 120.1, filed Feb. 2, 2022, the contents of both of which as are hereby incorporated by reference in their entirety.

The invention is based on the object of providing a system having a device for wirelessly transferring energy in the direction of an electrical load by means of inductive coupling, and having an electrical load, said system being as operationally reliable as possible.

The system has a device for wirelessly transferring energy in the direction of an electrical load by means of inductive coupling, also referred to as Wireless Power Transfer, WPT. Reference is also made to the relevant technical literature regarding the basic principles of WPT. The system is preferably operated according to the WPC (Wireless Power Consortium) Ki (Cordless Kitchen) standard. The device for wirelessly transferring energy in the direction of the electrical load by means of inductive coupling can also be referred to as a transmitter, and the electrical load can be referred to as a receiver. The device typically and conventionally has a transmitter coil for generating an alternating magnetic field.

The system further has an electrical load, particularly in the form of a Ki-enabled kitchen utensil, which is supplied with operating energy wirelessly by means of the device. The electrical load typically has a receiver coil in which a voltage which serves to supply the electrical load is induced due to the alternating magnetic field generated by means of the transmitter coil. The transmitter coil and the receiver coil are magnetically coupled. Reference is otherwise made to the relevant standards, in particular the Ki standard.

The system further has a placement surface or placement plate on which the electrical load is to be placed as intended for operating the system. The placement surface can be, for example, part of an induction hob having one or more induction cooking zones. The placement surface can be, for example, a predefined and/or visually marked area on a glass ceramic plate of an induction hob. In this case, the induction hob is supplemented in such a way that at least one cooking zone also has a Ki function (i.e. a transmitter function) in addition to the conventional induction function. The electrical load can then be operated wirelessly on this cooking zone, for example, in the form of a Ki-enabled kitchen appliance. Since this cooking zone can additionally operate as an induction cooking zone also, this is referred to as a dual function (induction+Ki).

The system further has a work surface or work plate adjacent to the placement surface, for example in the form of a conventional worktop which adjoins the placement surface in the form of a glass ceramic plate, for example on precisely one side.

The system further has a displacement sensor which is provided in order to determine whether or not the electrical load is displaced beyond a critical amount in the direction of the work surface. The critical amount can be defined, for example, in such a way that the electrical load at least partially overlaps the work surface when the electrical load is displaced beyond the critical amount.

The system further has a control unit coupled to the displacement sensor and designed to limit or to interrupt the transfer of energy in the direction of the electrical load if the electrical load is displaced beyond the critical amount in the direction of the work surface.

In an embodiment, the device has a radio frequency identification (RFID) reading device.

In an embodiment, the displacement sensor has a passive RFID transponder, wherein the RFID transponder is positioned and designed in such a way that a data transmission between the RFID reading device and the RFID transponder of the displacement sensor is possible only if the electrical load is displaced beyond the critical amount in the direction of the work surface, wherein the control unit is designed to check whether the data transmission between the RFID reading device and the RFID transponder of the displacement sensor is or is not possible, in order to determine whether the electrical load is or is not displaced beyond the critical amount in the direction of the work surface.

In an embodiment, the electrical load has an, in particular passive, RFID transponder, and the displacement sensor has an RFID notch filter circuit, wherein the RFID notch filter circuit is positioned and designed in such a way that a data transmission between the RFID reading device and the RFID transponder of the electrical load is no longer possible if the electrical load is displaced beyond the critical amount in the direction of the work surface, wherein the control unit is designed to check whether the data transmission between the RFID reading device and the RFID transponder of the electrical load is or is not possible, in order to determine whether the electrical load is or is not displaced beyond the critical amount in the direction of the work surface.

In an embodiment, the displacement sensor has a magnetic field sensor which is designed to detect an alternating magnetic field generated by means of the device, wherein the control unit is designed to check whether the alternating magnetic field is or is not detected, in order to determine whether the electrical load is or is not displaced beyond the critical amount in the direction of the work surface.

In an embodiment, the magnetic field sensor is positioned and designed in such a way that it is magnetically coupled to the device via the electrical load if the electrical load is displaced beyond the critical amount in the direction of the work surface, and that it is not magnetically coupled to the device if the electrical load is not displaced beyond the critical amount in the direction of the work surface.

In an embodiment, the magnetic field sensor has a conductor loop and a temperature-dependent resistor, for example an NTC, coupled to the conductor loop, wherein the control unit is designed to evaluate a resistance value of the temperature-dependent resistor in order to determine whether the electrical load is or is not displaced beyond the critical amount in the direction of the work surface.

In an embodiment, the placement surface has a temperature stability greater than 200° Celsius, in particular greater than 250° Celsius, and the work surface has a temperature stability up to a maximum of 200° Celsius.

The system according to the invention is preferably operated in accordance with the Ki standard. Ki is an emerging standard that is being defined and developed by the Wireless Power Consortium (WPC). Ki is based on inductive energy transfer and is intended to supply small household appliances and smart cookware wirelessly with powers up to 2.2 kW.

According to the operating principle of induction cooking zones, metallic, preferably ferritic, objects are heated by the induction field due to the alternating magnetic fields. However, along with the cooking utensils in which this effect is desired, other metallic objects that should remain cold can also be heated. Objects such as, for example, knives, forks or baking trays which are lying on the induction cooking zone can be undesirably heated by the induction cooking zone. The user is exposed to a risk of burns, and therefore such objects must be detected and must not be heated.

The problem also exists with Ki that metallic objects, also referred to as foreign objects (FO), can be located within the effective range of the transmitter coil and/or the receiver coil and can be substantially heated by the eddy currents induced by the alternating magnetic field. Critical positions for FOs are located near to a deployed receiver above the uncovered surface of the transmitter coil or, in the case of flat objects such as coins or rings, under the receiver coil also, wherein positions underneath the receiver coil and outside the transmitter coil can also result in impermissible heating of FOs.

The placement surface has a temperature-resistant surface, for example for roasting, grilling or frying, i.e. a user can injure himself by touching a hot FO, or the housing of the receiver which is typically equipped with flame retardants can begin to melt and emit odors, but the placement surface itself cannot spontaneously ignite due to a hot FO.

The Ki specification permits electrical loads or receivers having a diameter, for example of 23.5 cm, that is significantly greater than the preferred diameter of the transmitter coil, for example 15 to 18 cm. A displacement between the transmitter and receiver of up to 4 cm is further intended to be enabled, i.e. a large receiver with permitted displacement can project several centimeters (maximum 10.75 cm) beyond the edge of the transmitter coil during operation.

In the case of a transmitter coil placed near to an edge of the placement surface, operation of the receiver outside the placement surface and therefore on the work surface that is not temperature-resistant is therefore possible according to the Ki specification. However, if an FO is lying on the work surface below the receiver, the FO can reach a critical ignition temperature of the work surface.

It is possible by means of the invention to detect a displacement of the electrical load or receiver in the direction of the work surface beyond a critical amount, wherein, if said amount is exceeded, any FO placed on the work surface under the electrical load could become critically heated. If a critical displacement of this type is detected, the power feed is reduced to an uncritical level or is switched off completely.

In other words, an FO positioned under the receiver can become so hot through magnetic induction that it can damage or even ignite the work surface area. A displacement of the receiver beyond the edge of the temperature-resistant placement surface is detected according to the invention so that either the start of the energy transfer is prevented or an energy transfer is interrupted after a short time before the FO can reach critical temperatures.

As long as the electrical load is not displaced beyond the critical amount in the direction of the work surface, the displacement sensor is not actively connected or coupled, in particular magnetically, to the device or to its transmitter coil by means of the electrical load or its receiver coil. However, as soon as the electrical load is displaced beyond the critical amount in the direction of the work surface, the displacement sensor is actively connected or coupled to the device or its transmitter coil by means of the electrical load or its receiver coil, this being evaluated according to the invention for overlap detection.

The displacement sensor can have, for example, a near field communication (NFC) tag which is first detected by the transmitter through the coupling via the displaced receiver. As soon as the NFC address of said tag becomes visible, the Ki operation is suspended. The NFC tag can be arranged inside or outside a frame of the placement surface or even inside an adhesive which serves to fix the frame to the work surface. The NFC field can be directed with a ferrite foil in such a way that the NFC tag is not detected if the receiver is not displaced.

The displacement sensor can also have an NFC notch filter circuit which attenuates an NFC signal to such an extent that no NFC communication is possible between the receiver and the transmitter. The Ki operation can then also be interrupted.

The displacement sensor can also have a magnetic field sensor, in the simplest case in the form of a receiver loop having a temperature-dependent resistor which is arranged at the edge of the work surface, for example also inside a work surface frame. The magnetic field sensor is arranged in such a way that the alternating magnetic field of the transmitter coil is not injected into it if the receiver is placed as intended. Only if the alternating magnetic field has been displaced or distorted by a displaced receiver to such an extent that it reaches beyond the edge of the hob, the field also couples to the magnetic field sensor and can be detected.

The displacement sensor can also have a small, flat and magnetizable metal piece and a temperature-dependent resistor which has a heat-conducting connection thereto, wherein the metal piece is arranged as a representation of an FO in the peripheral area of the work surface. If the temperature measured by means of the temperature-dependent resistor exceeds a threshold temperature, it can be assumed that a temperature of an FO that is actually present would also exceed a permissible threshold value at this time, in which case the power feed must be switched off.

A common feature of all displacement sensors is that they can detect a displacement of the receiver up to the placement surface edge and therefore beyond the temperature-resistant area. The displacement sensor typically detects the alternating magnetic field between the transmitter coil and the receiver coil when said field is displaced toward the placement surface edge. A displacement of the receiver inside the placement surface which does not extend beyond the placement surface edge is uncritical, since both the placement surface and the receiver underside are non-flammable.

Figure 2:
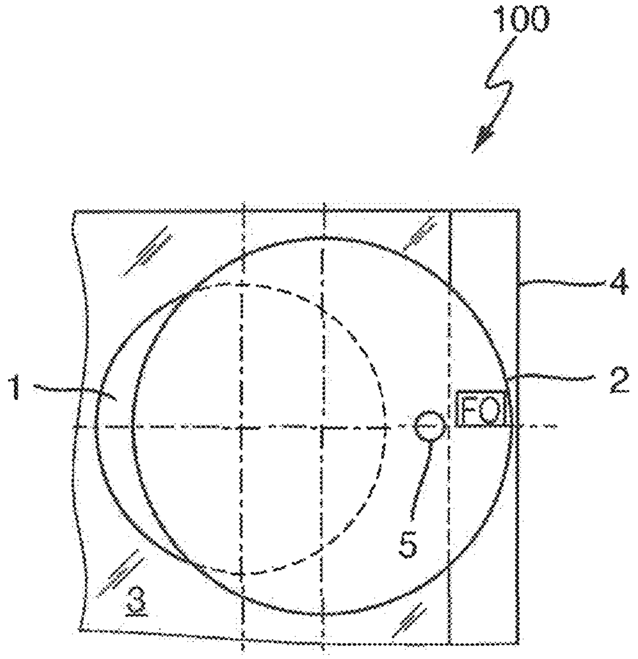

The invention is explained in detail below with reference to the drawings, wherein:

FIG. 1 shows a highly schematic representation of a block diagram of a system having a device for wirelessly transferring energy in the direction of an electrical load by means of inductive coupling, and an electrical load, and FIG. 2 shows a schematic top view of parts of the system shown in FIG. 1.

FIG. 1 shows a highly schematic representation of a block diagram of a system 100 having a device 1 for wirelessly transferring energy in the direction of an electrical load 2 by means of inductive coupling, and an electrical load 2. The device 1 is a Ki transmitter and the electrical load 2 is a Ki receiver. Reference is also made in this respect to the relevant Ki specification.

FIG. 2 shows a schematic top view of parts of the system 100 shown in FIG. 1.

With reference to FIGS. 1 and 2, the system 100 has: a placement surface 3 in the form of a glass ceramic plate on which the electrical load is to be placed as intended for operating the system 100, a work surface 4 adjacent to the placement surface 3 on a single side of the placement surface 3 and having a temperature stability up to 200° Celsius only, a displacement sensor 5 for determining whether the electrical load 2, as shown, is displaced beyond a critical amount in the direction of the work surface 4, and a control unit 6 which is coupled to the displacement sensor 5 and is designed to limit or interrupt the transfer of energy in the direction of the electrical load 2 if the electrical load 2, as shown, is displaced beyond the critical amount in the direction of the work surface 4.

The device 1 has a conventional transmitter coil 14 for generating an alternating magnetic field. The electrical load 2 correspondingly has a receiver coil 15 in which an AC voltage which serves to supply the electrical load is induced due to the alternating magnetic field generated by means of the device 1.

The device 1 has a conventional RFID reading device 7.

The displacement sensor 5 has a passive RFID transponder 8, wherein the RFID transponder 8 is positioned and designed in such a way that a data transmission between the RFID reading device 7 and the RFID transponder 8 of the displacement sensor 5 is possible only if the electrical load 2 is displaced beyond the critical amount in the direction of the work surface 4, wherein the control unit 6 is designed to check whether the data transmission between the RFID reading device 7 and the RFID transponder 8 of the displacement sensor 5 is or is not possible, in order to determine whether the electrical load 2 is or is not displaced beyond the critical amount in the direction of the work surface 4.

The electrical load 2 has a passive RFID transponder 9. The displacement sensor 5 can have an RFID notch filter circuit 10, wherein the RFID notch filter circuit 10 is positioned and designed in such a way that a data transmission between the RFID reading device 7 and the RFID transponder 9 of the electrical load 2 is no longer possible if the electrical load 2 is displaced beyond the critical amount in the direction of the work surface 4, wherein the control unit 6 is designed to check whether the data transmission between the RFID reading device 7 and the RFID transponder 9 of the electrical load 2 is or is not possible, in order to determine whether the electrical load 2 is or is not displaced beyond the critical amount in the direction of the work surface 4.

The displacement sensor 5 can have a magnetic field sensor 11 which is designed to detect an alternating magnetic field generated by means of the device 1, wherein the control unit 6 is designed to check whether the alternating magnetic field is or is not detected, in order to determine whether the electrical load 2 is or is not displaced beyond the critical amount in the direction of the work surface 4.

The magnetic field sensor 11 is positioned and designed in such a way that it is magnetically coupled to the device 1 via the electrical load 2 if the electrical load 2 is displaced beyond the critical amount in the direction of the work surface 4, and that it is not magnetically coupled to the device 1 if the electrical load 2 is not displaced beyond the critical amount in the direction of the work surface 4.

The magnetic field sensor 11 can have a conductor loop 12 and a temperature-dependent resistor 13 coupled to the conductor loop 12, wherein the control unit 6 is designed to evaluate a resistance value of the temperature-dependent resistor 13 in order to determine whether the electrical load 2 is or is not displaced beyond the critical amount in the direction of the work surface 4.

FIG. 2 shows the case where the electrical load 2 is displaced beyond the critical amount in the direction of the work surface 4. The circle denoted 1 indicates the position of the transmitter coil 14, and the circle denoted 2 indicates the position of the receiver coil 15. In the illustrated displacement of the electrical load 2, a ferromagnetic foreign object FO on the work surface 4 would be inductively coupled to the transmitter coil 14 via the electrical load 2 and, as a result, would possibly be heated beyond the flame temperature of the work surface 4. This is detected by means of the displacement sensor 5, whereupon an energy transfer is deactivated.

The invention claimed is:

1. A system (100), comprising:
an electrical load (2),
a device (1) for wirelessly transferring energy in a direction of the electrical load (2) by means of inductive coupling,
a placement surface (3) on which the electrical load (2) is to be placed as intended to operate the system (100),
a work surface (4) adjacent to the placement surface (3),
a displacement sensor (5) that determines whether the electrical load (2) is or is not displaced beyond a critical amount in the direction of the work surface (4), and
a control unit (6) coupled to the displacement sensor (5) and configured to limit or to interrupt transferring of energy in the direction of the electrical load (2) if the electrical load (2) is displaced beyond the critical amount in the direction of the work surface (4) 2
wherein:
the displacement sensor (5) has a magnetic field sensor (11) which is configured to detect an alternating magnetic field generated by means of the device (1),
the magnetic field sensor (11) is positioned under the work surface (4) and at an edge thereof inside a work surface frame, and
the control unit (6) is configured to check whether the alternating magnetic field is or is not detected, in order to determine whether the electrical load (2) is or is not displaced beyond the critical amount in the direction of the work surface (4).

2. The system (100) as claimed in claim 1, wherein the device (1) as an RFID reading device (7).

3. The system (100) as claimed in claim 2, wherein the displacement sensor (5) has a passive RFID transponder (8), wherein the RFID transponder (8) is positioned and designed in such a way that a data transmission between the RFID reading device (7) and the RFID transponder (8) of the displacement sensor (5) is possible only if the electrical load (2) is displaced beyond the critical amount in the direction of the work surface (4), wherein the control unit (6) is designed to check whether the data transmission between the RFID reading device (7) and the RFID transponder (8) of the displacement sensor (5) is or is not possible, in order to determine whether the electrical load (2) is or is not displaced beyond the critical amount in the direction of the work surface (4).

4. The system (100) as claimed in claim 2, wherein:
the electrical load (2) has an RFID transponder (9), and
the displacement sensor (5) has an RFID notch filter circuit (10), wherein the RFID notch filter circuit (10) is positioned and designed in such a way that a data transmission between the RFID reading device (7) and the RFID transponder (9) of the electrical load (2) is no longer possible if the electrical load (2) is displaced beyond the critical amount in the direction of the work surface (4), wherein the control unit (6) is designed to check whether the data transmission between the RFID reading device (7) and the RFID transponder (9) of the electrical load (2) is or is not possible, in order to determine whether the electrical load (2) is or is not displaced beyond the critical amount in the direction of the work surface (4).

5. The system (100) as claimed in claim 1, wherein the magnetic field sensor (11) is positioned and designed in such a way that it is magnetically coupled to the device (1) via the electrical load (2) if the electrical load (2) is displaced beyond the critical amount in the direction of the work surface (4), and that it is not magnetically coupled to the device (1) if the electrical load (2) is not displaced beyond the critical amount in the direction of the work surface (4).

6. The system (100) as claimed in claim 1, wherein:

the magnetic field sensor (11) has a conductor loop (12) and a temperature-dependent resistor (13) coupled to the conductor loop (12), and the control unit (6) is designed to evaluate a resistance value of the temperature- dependent resistor (13) in order to determine whether the electrical load (2) is or is not displaced beyond the critical amount in the direction of the work surface (4).

7. The system (100) as claimed in claim 1, wherein:

the placement surface (3) has a temperature stability greater than 200° Celsius, and the work surface (4) has a temperature stability up to a maximum of 200° Celsius.

* * * * *